United States Patent
Zou et al.

(10) Patent No.: US 10,511,617 B2
(45) Date of Patent: Dec. 17, 2019

(54) METHOD AND SYSTEM FOR DETECTING MALICIOUS CODE

(71) Applicant: iYuntian Co., Ltd., Beijing (CN)

(72) Inventors: Rongxin Zou, Beijing (CN); Yinming Mei, Beijing (CN); Jun Yao, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 37 days.

(21) Appl. No.: 14/985,927

(22) Filed: Dec. 31, 2015

(65) Prior Publication Data

US 2016/0352763 A1 Dec. 1, 2016

(30) Foreign Application Priority Data

May 27, 2015 (CN) .......................... 2015 1 0280539

(51) Int. Cl.
*H04L 29/06* (2006.01)
(52) U.S. Cl.
CPC ................................. *H04L 63/1425* (2013.01)
(58) Field of Classification Search
CPC .................................................... H04L 63/1425
USPC ........................................................... 726/24
See application file for complete search history.

(56) References Cited

U.S. PATENT DOCUMENTS

| | | | | |
|---|---|---|---|---|
| 5,960,170 A * | 9/1999 | Chen | ...................... | G06F 21/564 714/26 |
| 7,065,789 B1 * | 6/2006 | Neyman | ................ | H04L 63/145 713/188 |
| 7,240,213 B1 * | 7/2007 | Ritter | ...................... | G06Q 40/00 380/246 |
| 7,284,273 B1 * | 10/2007 | Szor | ....................... | G06F 21/564 726/22 |
| 7,290,282 B1 * | 10/2007 | Renert | ................... | G06F 21/562 726/22 |
| 7,953,969 B2 * | 5/2011 | Neystadt | ............. | H04L 63/1416 709/225 |
| 8,056,136 B1 | 11/2011 | Zaitsev | | |
| 8,214,904 B1 * | 7/2012 | Doukhvalov | ........... | G06F 21/56 726/24 |

(Continued)

FOREIGN PATENT DOCUMENTS

| CN | 102346828 A | 2/2012 |
|---|---|---|
| CN | 103034805 A | 4/2013 |

(Continued)

*Primary Examiner* — Jahangir Kabir
(74) *Attorney, Agent, or Firm* — Lathrop Gage LLP

(57) ABSTRACT

The present application discloses a method and a system for detecting malicious code. The method comprises receiving a testing sample; testing the sample with a plurality of malicious code detectors to obtain a plurality of testing results; determining a credibility scale and a reputation value of each of the testing results, wherein the credibility scale indicates whether the testing result is malicious or safe, and the reputation value indicates a quantified trust level corresponding to the credibility scale; and determining a final detection result of the testing sample based on the determined credibility scales and the reputation values of the testing results. According to the technical solution of the present application, the testing results obtained from various malicious code detectors are rationally utilized to improve the testing accuracy for the malicious code.

9 Claims, 5 Drawing Sheets

(56) References Cited

U.S. PATENT DOCUMENTS

| | | | | |
|---|---|---|---|---|
| 8,312,537 | B1* | 11/2012 | Nachenberg | H04L 63/145 705/64 |
| 8,402,541 | B2* | 3/2013 | Craioveanu | G06F 21/563 712/233 |
| 8,413,235 | B1* | 4/2013 | Chen | G06F 21/552 713/188 |
| 8,443,449 | B1* | 5/2013 | Fan | G06F 21/564 713/188 |
| 8,566,932 | B1* | 10/2013 | Hotta | G06F 11/00 726/2 |
| 8,738,721 | B1* | 5/2014 | Smirnov | H04L 51/12 709/206 |
| 8,752,179 | B2* | 6/2014 | Zaitsev | G06F 21/568 713/188 |
| 8,914,406 | B1* | 12/2014 | Haugsnes | H04L 67/1097 382/305 |
| 9,009,820 | B1* | 4/2015 | McDougal | G06F 21/56 726/22 |
| 9,065,849 | B1* | 6/2015 | Rivera | H04L 63/1433 |
| 9,100,428 | B1* | 8/2015 | Visbal | H04L 63/1441 |
| 9,432,391 | B2* | 8/2016 | Wang | H04L 63/1433 |
| 9,692,782 | B2* | 6/2017 | Turnbull | G06F 21/55 |
| 2002/0178383 | A1* | 11/2002 | Hrabik | H04L 63/1416 726/4 |
| 2004/0034794 | A1* | 2/2004 | Mayer | G06F 21/567 726/23 |
| 2004/0083408 | A1* | 4/2004 | Spiegel | G06F 21/566 714/43 |
| 2004/0243829 | A1* | 12/2004 | Jordan | G06F 21/566 726/24 |
| 2004/0250124 | A1* | 12/2004 | Chesla | G06F 21/552 726/13 |
| 2006/0031359 | A1* | 2/2006 | Clegg | H04L 51/12 709/206 |
| 2006/0155553 | A1* | 7/2006 | Brohman | G06Q 10/0635 705/7.28 |
| 2006/0253580 | A1* | 11/2006 | Dixon | G06F 21/50 709/225 |
| 2007/0169194 | A1* | 7/2007 | Church | G06F 21/552 726/23 |
| 2007/0294768 | A1* | 12/2007 | Moskovitch | G06F 21/566 726/24 |
| 2008/0028463 | A1* | 1/2008 | Dagon | H04L 29/12066 726/22 |
| 2009/0044024 | A1* | 2/2009 | Oberheide | G06F 21/562 713/188 |
| 2009/0044276 | A1* | 2/2009 | Abdel-Aziz | H04L 63/1425 726/24 |
| 2009/0064323 | A1* | 3/2009 | Lin | H04L 51/12 726/22 |
| 2009/0158432 | A1* | 6/2009 | Zheng | G06F 21/562 726/24 |
| 2010/0115040 | A1* | 5/2010 | Sargent | G06Q 10/10 709/206 |
| 2011/0219450 | A1* | 9/2011 | McDougal | G06F 21/56 726/23 |
| 2011/0239295 | A1* | 9/2011 | Sorge | H04L 51/12 726/22 |
| 2012/0005751 | A1 | 1/2012 | Chen et al. | |
| 2012/0151586 | A1* | 6/2012 | Hentunen | G06F 21/563 726/24 |
| 2012/0255019 | A1* | 10/2012 | McNamee | G06F 21/554 726/24 |
| 2013/0042294 | A1* | 2/2013 | Colvin | G06F 21/53 726/1 |
| 2013/0074185 | A1* | 3/2013 | McDougal | G06F 21/561 726/24 |
| 2013/0097701 | A1* | 4/2013 | Moyle | G06F 21/552 726/22 |
| 2013/0246605 | A1* | 9/2013 | Mahadik | H04L 63/1433 709/224 |
| 2013/0298230 | A1* | 11/2013 | Kumar | G06F 21/52 726/22 |
| 2014/0013434 | A1* | 1/2014 | Ranum | H04L 63/145 726/24 |
| 2014/0082730 | A1* | 3/2014 | Vashist | H04L 63/1416 726/22 |
| 2014/0223566 | A1* | 8/2014 | Zaitsev | G06F 21/567 726/24 |
| 2014/0283065 | A1* | 9/2014 | Teddy | H04L 63/145 726/23 |
| 2014/0337974 | A1* | 11/2014 | Joshi | H04L 63/1425 726/23 |
| 2015/0121449 | A1* | 4/2015 | Cp | H04L 63/145 726/1 |
| 2015/0172300 | A1* | 6/2015 | Cochenour | H04L 63/1425 726/23 |
| 2015/0207813 | A1* | 7/2015 | Reybok | G06F 21/552 726/22 |
| 2016/0036833 | A1* | 2/2016 | Ardeli | H04L 63/101 726/22 |
| 2016/0180084 | A1* | 6/2016 | Spurlock | G06F 21/552 726/23 |
| 2016/0205125 | A1* | 7/2016 | Kim | H04L 63/1416 726/23 |
| 2016/0378978 | A1* | 12/2016 | Singla | G06F 21/55 726/23 |
| 2017/0004303 | A1* | 1/2017 | Yan | G06F 21/566 |

FOREIGN PATENT DOCUMENTS

| | | |
|---|---|---|
| CN | 104580203 A | 4/2015 |
| JP | 2012083909 A | 4/2012 |
| JP | 2014515857 A | 7/2014 |
| KR | 1020120112696 A | 10/2012 |
| KR | 1020140122964 A | 10/2014 |

* cited by examiner

| Rule ID | Operation Type | Detector Engine | Conflict Priority | Evaluation Rule | Credibility Scale | Reputation Value | Others |
|---|---|---|---|---|---|---|---|
| 413 | 0 | GScan | 10 | PUA.Win32.Softenapp.susp | gray | 50 | |
| 412 | 0 | GScan | 10 | PUA.Win32.InstallMonstr.LLCS | suspected black | 59 | |
| 411 | 0 | AScan | 10 | Trojan.Win32.Patched.* | gray | 1 | |
| 410 | 119 | DScan | 1 | 0.1 | gray | 1 | |
| 409 | 0 | PScan | 10 | Adare/BBar* | gray | 1 | |
| 408 | 609 | DScan | 1 | 0.1 | gray | 1 | |
| 407 | 608 | DScan | 1 | 0.1 | gray | 1 | |
| 406 | 601 | DScan | 1 | 0.1 | gray | 1 | |
| 405 | 0 | GScan | 10 | Adware.Win32.MultiPlug.susp | suspected black | 50 | |
| 404 | 0 | GScan | 8 | Adware.Win32.Downloader.Gex | black | 100 | |
| 403 | 0 | GScan | 10 | Adware.Win32.Solimba.susp | gray | 50 | |
| 402 | 0 | GScan | 10 | PUA.Win32.Montiera.cras | gray | 50 | |

Fig. 3

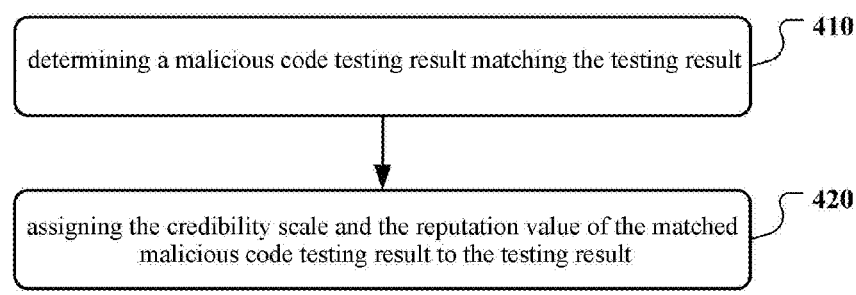

Fig. 4

METHOD AND SYSTEM FOR DETECTING MALICIOUS CODE

RELATED APPLICATION

The present application claims priority and benefits of Chinese patent application No. 201510280539.1 filed on May 27, 2015, which is incorporated herein by reference in its entirety.

TECHNICAL FIELD

The present disclosure relates generally to the field of computer technology, particularly, to the field of network and information security, and more particularly, to a method and system for detecting malicious code.

BACKGROUND

Malicious code has benefited from the rapid development of the Internet, and formed a supply chain for felonious demands. Malicious code is an ill-intended program for the purpose of endangering the information security, and usually lurks in a victimized computer waiting to cause damage or misappropriate information. The conventional client-based testing method has evolved to cloud-based detection and elimination testing method as tens of thousands of new malicious code samples are created every day.

Cloud-based virus detecting and elimination method is a cloud-based computing application in the antivirus field. The cloud-based computing is a service delivery model for enabling a convenient, on-demand network access to a shared pool of configurable computing resources. Briefly, cloud-based computing service providers build a storage and operation center for cloud-based computing. Users access the "cloud" through network and use the "cloud" as a data storage and application service center. Cloud-based detecting and elimination utilizes a cluster of online servers, built by antivirus software manufacturers, to store a comprehensive collection of testing features and rules; and various detectors to match and detect. Software clients send information regarding the to-be-inspected entity through the Internet to the cloud-based server and await the inspection results from the server.

However, the testing approaches of the various detectors have their respective advantages and disadvantages, and the testing results may also be false positive, affecting the final detection results provide by the cloud-based servers.

SUMMARY OF THE INVENTION

The present disclosure provides a solution which may effectively improve the malicious code detection.

In a first aspect, an embodiment of the present application provides a method for detecting malicious code. The method comprises: receiving a testing sample; testing the testing sample with a plurality of malicious code detectors to acquire a plurality of testing results; determining a credibility scale and a reputation value of each of the testing results, wherein the credibility scale indicates whether the testing result is malicious, and the reputation value indicates a quantified trust level corresponding to the credibility scale; and determining a final detection result of the testing sample based on the determined credibility scales and the reputation values of the testing results.

In a second aspect, an embodiment of the present application also provides a system for detecting malicious code. The system comprises a cloud-based detecting server for receiving a testing sample; a plurality of malicious code detectors for receiving the testing sample from the cloud-based detecting server and detecting the testing sample to acquire a plurality of testing results; and a file reputation decider for determining a credibility scale and a reputation value of each of the testing results and determining a final detection result of the testing sample based on the credibility scales and the reputation values of the testing results, wherein the credibility scale indicates whether the testing result is malicious, and the reputation value indicates a quantified trust level corresponding to the credibility scale.

In the solution for detecting malicious code provided by the embodiments of the present application, a credibility scale and a reputation value is assigned to each of the testing results acquired from a plurality of malicious code detectors, thus accurate malicious code testing can be provided by using features of various types of malicious code detectors. In some embodiments, the testing result is determined based on the reputation value, which indicates the false positive rate of the malicious code detector, thus decreasing the false positive rate of the testing result of the sample. In other embodiments, the decision policy for the credibility scale and the reputation value is used, thus adjusting the result of the decision based on the credibility scale and the granularity of the reputation value of the testing result.

BRIEF DESCRIPTION OF THE DRAWINGS

Other features, objectives and advantages will become more apparent from the detailed description to non-limiting embodiments with reference to the accompanying figures, wherein:

FIG. 3 illustrates an exemplary rule table of the file reputation scoring policy according to the present application;

FIG. 4 illustrates an exemplary flow chart of a method for determining the credibility scale and the reputation value of the testing result using a rule table according to an embodiment of the present application;

DETAILED DESCRIPTION OF THE EMBODIMENTS

The present application will be further described in detail in conjunction with the accompanying drawings and embodiments. It will be understood that specific embodiments described herein are only intended to explain the invention, instead of limiting the invention. It should also be noted that only portions related to the invention are shown in the figures for the convenience of description.

It should be noted that the embodiments of the present application and the features in the embodiments may be combined with each other if there is no conflict. Now the present application will be further described in detail in conjunction with the accompanying drawing and embodiments.

Figure 1:
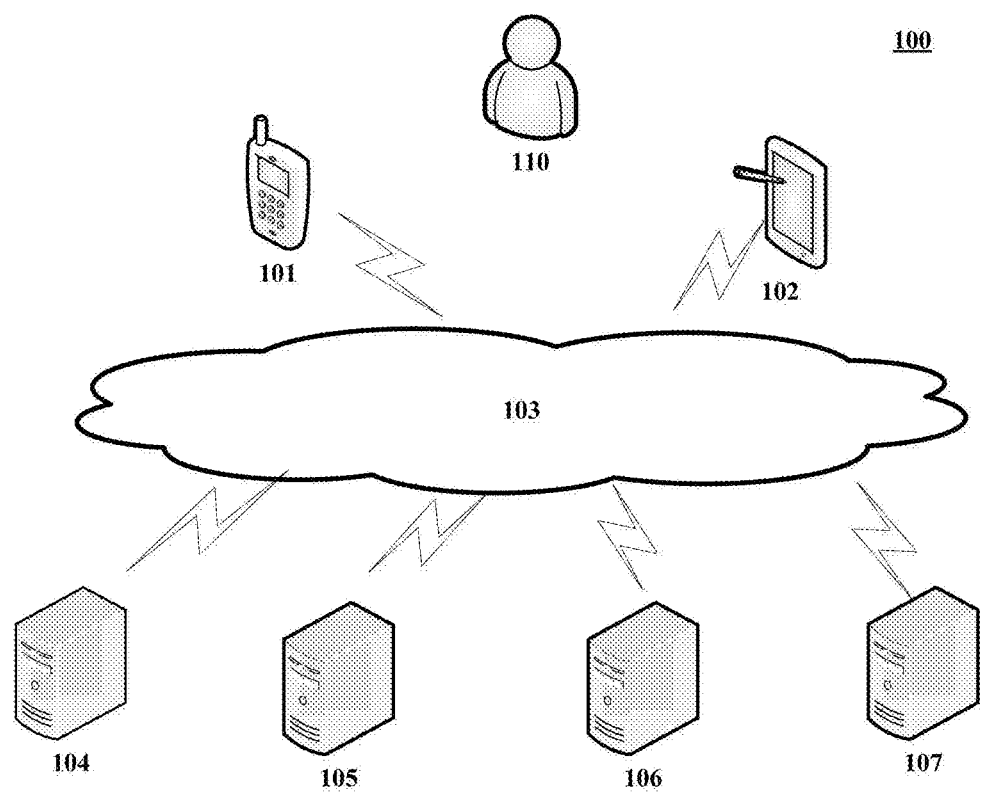
FIG. 1 illustrates an exemplary system architecture applicable to an embodiment of the present application.

Referring to FIG. 1, an exemplary system architecture 100 according to an embodiment of the present application is shown.

As shown in FIG. 1, the system 100 may include terminal devices 101, 102, a network 103 and servers 104, 105, 106, 107. The network 103 provides a medium for communication links between the terminal devices 101, 102 and servers 104, 105, 106, 107. The network 103 may include various types of connections, such as a wired communication link, a wireless communication link, a fiber-optic cable, or the like.

A user 110 may use the terminal devices 101, 102 to interact with the servers 104, 105, 106 and 107 via the network 103 to access various services, such as browsing webpage, downloading data, etc. The terminal devices 101, 102 may be installed with various client applications, such as a browser, a security application, etc.

The terminal devices 101, 102 may be various kinds of electronic devices, including but not limited to a personal computer, a smart phone, a smart TV, a tablet computer, a personal digital assistant, an e-book reader, etc.

The servers 104, 105, 106, 107 may be servers for providing various services. The servers may provide services in response to a service request from a user. It will be understood that one server may provide one or more service types, and one service type may also be provided by a plurality of servers. In the embodiments of the present application, the server involved may be located in the cloud, and may include, but not be limited to, a cloud-based detecting server, various types of malicious code detection servers, a file reputation determining server, etc.

It will be understood that the numbers of the terminal devices, the networks and the servers as shown in FIG. 1 are only for illustrative purposes. Any number of terminal devices, networks and servers may exist as required.

As mentioned in the background section, existing testing methods of the various malicious code detectors have their respective advantages and disadvantages, and the testing results may also be false positive, affecting the final detection results provide by the cloud-based servers.

In view of the above deficiencies in the prior art, an embodiment of the present application provides a malicious code detecting solution based on a reputation value of a file. In particular, credibility scale and reputation values are assigned to testing results for the testing sample obtained by the respective malicious code detectors. The credibility scale may indicate whether the testing result is malicious or safe. The reputation value may indicate the quantified trust level corresponding to the credibility scale. Then, the final detection result of the testing sample is determined based on the credibility scale and the reputation value of the one or more testing result.

Figure 2:
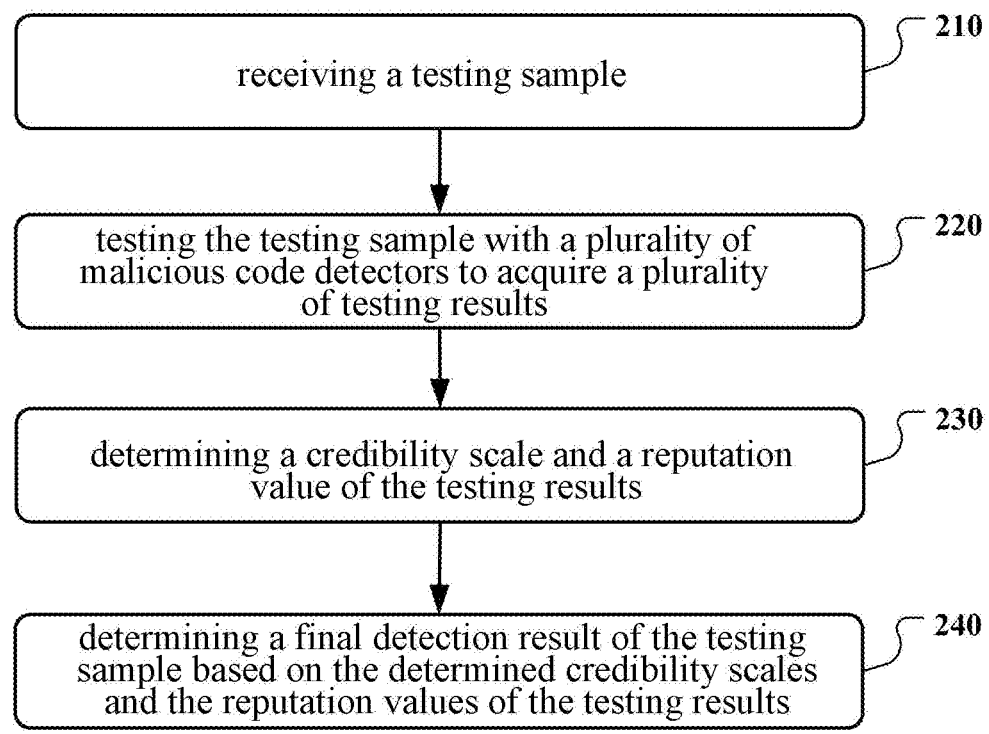
FIG. 2 illustrates an exemplary flow chart of a method for detecting malicious code according to an embodiment of the present application.

Referring to FIG. 2, an exemplary flow chart of a method for detecting malicious code according to an embodiment of the present application is shown. The method shown in FIG. 2 is implemented by a server-side system, which may be located in the cloud.

As shown in FIG. 2, a testing sample is received at step 210.

The server receives a testing sample from a client. When there is a need for malicious code testing or virus elimination, the client may submit a request to the server and upload the sample to be tested to the server at the same time.

Next, at step 220, the testing sample is tested by a plurality of malicious code detectors to obtain a plurality of testing results.

After receiving the testing sample, the server distributes the detection sample to the plurality of malicious code detectors to execute malicious code testing at each of the malicious code detectors.

In some embodiments, the server may perform a preprocessing to the testing sample before sending it to the malicious code detectors. The preprocessing may include performing different types of processing to different types of testing sample. For example, for a compressed packet, the server may perform a decompression to the compressed package first.

In some embodiments, the server may selectively send the testing sample to some or all of the malicious code detectors. For example, the server may exclude the malicious code detector that is obviously unsuitable for the testing sample according to the features of the testing sample, thereby improving the accuracy of the testing result.

Generally speaking, according to the different features on which the testing methods are based, the malicious code detectors may be divided into static characteristic based detectors, dynamic behavior based detectors, and static characteristic and dynamic behavior based detectors. The static characteristics may include, for example: the file name, the program form, the number of APIs (application program interface), the version information of the file, the file length information, the PE (portable executable) structure characteristic, the file packing information, etc. The dynamic behaviors may include, for example: the auto-initiation behavior, the process hiding behavior, the communication hiding behavior, etc. The present application does not limit the type of the malicious code detector and may use various types of malicious code detectors known in the prior art or developed in the future.

The testing result of the malicious code detector may, for example, include the type of the malicious code detected during the testing. Computer Antivirus Research Organization (CARO) has proposed a naming method for the malicious code types, the naming rule of which is shown as follows:

[<malware_type>://][<platform>]/<family_name>
    [.<group_name>]\[.<infective_length>][.<vari-
    ant>[<devolution>]][<modifiers>]

wherein the field <malware_type> indicates the type of the malicious code (such as virus, backdoor, Trojan, adware). The field <platform> defines the operating system environment required for executing the malicious code. For example, "W32" or "Win32" refers to a 32-bit Windows operating system, "Linux" refers to a Linux system, and "OSX" refers to a Mac OSX. The field <family_name> and the field <group_name> usually refer to the family information of the malicious code. The field <infective_length> refers to the infective length of the file infecting virus. The field <variant> (typically one letter) is used to distinguish variants of the same malicious code family. The remaining fields are defined according to the respective environments.

The following examples are some common examples of malicious code name definitions:

Net-Worm://Win32.Welchia a Windows platform network worm;

Backdoor://Win32.ciadoor.121 a Windows platform backdoor Trojan belonging to the ciadoor family;

Virus://Win32.Parite.B a Windows memory-resident file infecting virus belonging to the Parite family.

Since the aforementioned naming rules are not compulsory, different anti-malicious code service providers may adopt different naming approaches for malicious code types. In other words, different malicious code detectors may adopt different names for the malicious code detected from the same testing sample.

Next, the credibility scale and the reputation value of the testing result are determined at step 230.

As used herein, the credibility scale indicates, for example, whether the testing result is malicious or safe, i.e., whether the type of the tested malicious code possesses a threat, or whether it is safe, and the reputation value indicates, for example, the quantified trust level corresponding to the credibility scale.

In some embodiments, the credibility scale may include any one of the following terms: black, white, gray, suspected black, and suspected white, wherein black indicates that the testing sample is malicious, white indicates that the testing sample is safe, gray indicates an uncertain testing result, suspected black indicates that the testing sample is potentially malicious, and suspected white indicates that the testing sample is potentially safe.

The reputation value may be expressed using numerical characteristics, for example, using positive integers. A reputation value can be assigned to each level of the credibility scale of the testing result. For example, if the credibility scale of a testing result is black, the corresponding reputation value is 100, which indicates a high probability that the sample related to the testing result is malicious. As another example, if the credibility scale of a testing result is gray, the corresponding reputation value is 1, which indicates that the testing result is uncertain whether the sample is malicious, and the corresponding quantified trust level of the uncertainty is low.

In some embodiments, the credibility scale and the reputation value of the testing result are determined in accordance with the file reputation scoring policy. The file reputation scoring policy presets the test result credibility scales for various types of malicious code based on known information of various types of known malicious code, and the reputation values for various types of malicious code testing results based on the false positive rates of the malicious code detectors. For example, the credibility scales of the malicious code testing results may be preset according to the known information based on various types of known malicious code and their families. In addition, according to the historical detecting results of the malicious code detector, the false positive rate of the malicious code detector may be counted, so that the reputation values of the various malicious code testing results are preset based on the false positive rate. Alternatively or additionally, the credibility scale and/or reputation value may be manually adjusted by virus analysts based on their accumulated experience.

FIG. 3 illustrates an exemplary rule table of the file reputation scoring policy according to the present application. Step 230 in FIG. 2 shows that the credibility scale and the reputation value of the testing result may be determined according to the rule table.

As shown in FIG. 3, the first column shows the rule ID, identifying different rules. The second column shows the task type, namely, the task type that the detector engine performs. The task type may be, for example, distinguished by the urgency and importance of the file to be processed. The third column identifies the detector engines, namely the malicious code detectors. The fourth column shows the collision priority, indicating the priorities of the rules when a collision occurs between the rules (described in further detail below). The fifth column shows the detection rule, i.e. various testing results provided by the detector engines, which identifies the types of the testing malicious code. The sixth column shows the credibility scale, indicating the credibility scale corresponding to each of the rules or the malicious code testing results. The seventh column shows the reputation value, indicating each rule's quantified trust level corresponding to respective credibility scale. It will be understood that the rule table may also include other contents, which are not shown in FIG. 3 to avoid obscuring unnecessarily the embodiment of the present application.

FIG. 4 shows an exemplary flow chart of a method for determining the credibility scale and the reputation value of the testing result using a rule table according to an embodiment of the present application, i.e., an exemplary implementation of step 230 shown in FIG. 2.

As shown in FIG. 4, at step 410, a malicious code testing result matching the testing result is determined. At this step, the rule matching the testing result may be determined by looking up the rule table.

For example, the testing results of the sample 72AAC543B9CBBF597852E254325772BF obtained from several malicious code detectors are:

GScan: Adware.Win32.MultiPlug.susp
PScan: Win32/Ramnit.A virus
DScan: 0.2

Taking the rule table shown in FIG. 3 as an example, it is determined that the testing result of the GScan detector engine is matched with the rule 405. The results of the PScan detector engine and the DScan detector engine have no matched rule.

Next, at step 420, the credibility scale and the reputation value of the matched malicious code testing result are assigned to the corresponding testing result.

Continuing with the example above, according to the rule table shown in FIG. 3, the credibility scale of the rule 405 is suspected black with a value of 50. Accordingly, the credibility scale of the GScan detector testing result is suspected black with a value 50. The results of the remaining detectors do not have matched rules, and can therefore be optionally dismissed.

Returning to FIG. 2, after the credibility scale and the reputation value of the testing result are determined, at step 240, the final detection result is determined based on the credibility scale and the reputation value of the testing result.

In some embodiments, the credibility scale and the reputation value of the testing result are processed based on the decision policy for the credibility scale and the reputation value to obtain the final detection result of the testing sample.

When several testing results are consistent with one another, the final detection result may be easily determined. However, when several testing results do not correlate with each other, i.e. when a conflict exists, the decision policy for the credibility scale and the reputation value may further consider the collision priority of the testing results and/or the reputation value. Therefore, in the aforementioned step 230, the collision priority is assigned to each of the testing results simultaneously based on the assignment policy for the file reputation (for example, assigned according to the collision priority in the 4th column of the table in FIG. 3). Various types of decision strategies for the credibility scale and the reputation value may be designed to determine the final detection result.

Figure 5:
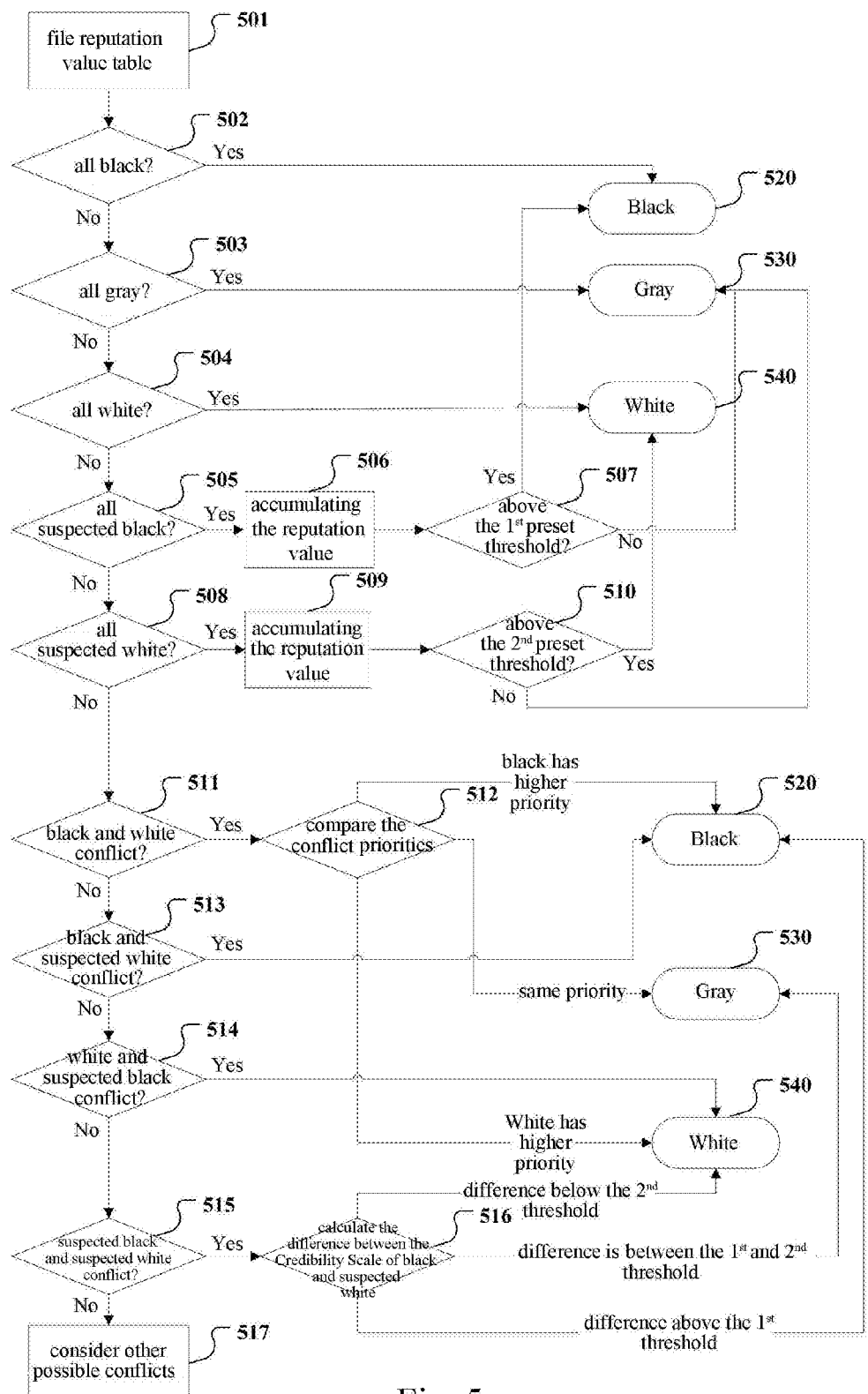
FIG. 5 illustrates an exemplary flow chart of decision logic for determining the credibility scale and the reputation value according to the present application.

FIG. 5 shows an exemplary decision logic flow chart of the decision policy for the credibility scale and the reputation value according to the present application.

As shown in FIG. 5, at step 501, the testing results with determined credibility scale and reputation value are summarized into a file reputation value table. Next, at step 502, it is determined whether all credibility scales of the testing results are black. If yes, advance to step 520, where the final detection result is determined to be black; otherwise, advance to step 503.

At step 503, it is determined whether all credibility scales of the testing results are gray. If yes, advance to step 530, where the final detection result is determined to be gray; otherwise, advance to step 504.

At step 504, it is determined whether all credibility scales of the testing results are white. If yes, advance to step 540, where the final detection result is determined to be white; otherwise, advance to step 505.

At step 505, it is determined whether all credibility scales of the testing results are suspected black. If yes, the reputation values of the testing results are accumulated at step 506. Next, at step 507, it is determined whether the accumulated reputation value is larger than or equal to a first preset threshold. If yes, advance to step 520, where the final detection result is determined to be black; otherwise, advance to step 530, where the final detection result is determined to be gray. The first preset threshold may, for example, be 100. If the result is negative at step 505, advance to step 508.

At step 508, it is determined whether all credibility scales of the testing results are suspected white. If yes, the reputation values of the testing results are accumulated at step 509. Next, at step 510, it is determined whether the accumulated reputation value is larger than or equal to a second preset threshold. If yes, advance to step 540, where the final detection result is determined to be white; otherwise, advance to step 530, where the final detection result is determined to be gray. The second preset threshold may, for example, be 100. If the result is negative at step 508, advance to step 511.

At step 511, it is determined whether the credibility scales of the testing results are in conflict wherein some of the credibility scales are black while the rest are white. If yes, the collision priorities of the testing results are compared at step 512. If the testing result with the black credibility scale has the highest collision priority, advance to step 520 where the final detection result is determined to be black. If the testing result with the white credibility scale has the highest collision priority, advance to step 540 where the final detection result is determined to be white. That is, the final detection result is consistent with the testing result having the highest collision priority. If the testing result with the black credibility scale has the same collision priority as the testing result with the white credibility scale, advance to step 530 where the final detection result is determined to be gray. If the result is negative at step 511, advance to step 513.

At step 513, it is determined whether the credibility scales of the testing results are in conflict wherein some of the credibility scales are black while the rest are suspected white. If yes, advance to step 520 where the final detection result is directly determined to be black; otherwise, advance to step 514.

At step 514, it is determined whether the credibility scales of the testing results are in conflict wherein some of the credibility scales are white while the rest are suspected black. If yes, advance to step 520 where the final detection result is directly determined to be white; otherwise, advance to step 515.

At step 515, it is determined whether the credibility scales of the testing results are in conflict wherein some of the credibility scales are suspected black while the rest are suspected white. If yes, the difference between the reputation value of the testing result which is suspected black and the reputation value of the testing result which is suspected white is determined at step 516. For example, the difference can be obtained by subtracting the reputation value of the testing result which is suspected white from the reputation value of the testing result which is suspected black, or vice versa. If the difference between the reputation value of the testing result which is suspected black and the reputation value of the testing result which is suspected white is larger than or equal to a first threshold, i.e., the former is sufficiently larger than the latter, advance to step 520 where the final detection result is determined to be black. If the difference between the reputation value of the testing result which is suspected black and that of the testing result which is suspected white is less than or equal to a second threshold, i.e., the former is sufficiently lower than the latter, advance to step 540 where the final detection result is determined to be white. If the difference between the reputation value of the testing result which is suspected black and that of the testing result which is suspected white is between the first and second threshold, i.e., the difference between the suspected black testing result and the suspected white testing result is not big enough, advance to step 530 where the final detection result is determined as gray. In some embodiments, the first threshold and the second threshold may have the identical absolute value. For example, the first threshold is 100 and the second threshold is −100. Thus, the above decision logic may also be expressed as follows: if a plurality of testing results are in conflict wherein some of the credibility scales are suspected back while the rest are suspected white, the final detection result is determined to be identical with the testing result corresponding to the highest reputation value when the difference between the reputation values corresponding respectively to the testing result of suspected black and that of suspected white is larger than a third preset threshold, otherwise the final detection result is determined to be gray. Here, the third preset threshold is the absolute value of the first threshold and the second threshold, for example, 100.

If the result is negative at step 515, advance to step 517 to determine if any other possible conflicts exit. These conflicts may not be significant, so that some simple decision logic may be used to make determination. For example, for a conflict between black and suspected black, the final result is determined to be black; for a conflict between white and suspected white, the final result is determined to be white; for a conflict between suspected black and gray, the final result is determined to be gray. For the purpose of clarity and simplicity, the conflicts are not depicted in FIG. 5. Additionally, for the purpose of a clear wiring layout, FIG. 5 shows a block diagram with overlapped blocks for the final results: the black state 520, the gray state 530 and the white state 540, which does not affect the decision logic shown in FIG. 5.

It will be understood that the decision logic shown in FIG. 5 is merely exemplary, and other decision logics can be provided by those skilled in the art. For example, the conflict between black and white solved by the determination based on the collision priority may also be solved by the determination based on the reputation value, which is similar to the method solving the conflict between suspected black and suspected white. As another example, the conflict between suspected black and suspected white solved by the determination based on the reputation value may also be solved by the determination based on the collision priority. As yet another example, the conflict between black and white or the conflict between suspected black and suspected white may consider both the collision priority and the reputation value. For example, a determination based on the collision priority is made first, and if the collision priorities are the same, a determination is made based on the reputation value.

Coming back to the previous example, i.e., the testing results of the sample 72AAC543B9CBBF597852E254325772BF obtained by a plurality of malicious code detectors are:
  GScan: Adware.Win32.MultiPlug.susp
  PScan: Win32/Ramnit.A virus
  DScan: 0.2

Applying the exemplary rule table in FIG. 3, the testing result of the GScan detector engine is matched with the rule 405, and the credibility scale is suspected black with a value of 50. The results of the remaining detectors do not have matched rules, and those results are dismissed.

According to the decision logic shown in FIG. 5, the credibility scale of the testing result is suspected black with a value of 50, which is below the first preset threshold (for example, 100). Therefore, the final detection result is determined to be gray.

As another example, the testing results of the sample EF1766F750C01D741F8D980DC345DD2F obtained by a plurality of malicious code detectors are:
  GScan: Adware.Win32.Downloader.Gex
  PScan: Win32/Wapomi.AX virus
  DScan: 0.3

Applying the exemplary rule table in FIG. 3, the testing result of the GScan detector engine is matched with the rule 405, and the credibility scale is black with a value of 100. The result of the remaining detector does not have matched rules, and this result is dismissed.

According to the decision logic shown in FIG. 5, all credibility scales of the testing results are black. Therefore, the final detection result is determined to be black.

It should be noted that, although the operations in the method of the invention are described in the given sequence in the drawings, it is not required or suggested that the operations must follow such sequence or the desired results may only be achieved by performing all operations. On the contrary, the executed sequence of the steps depicted in the flow chart may be altered. For example, various decision logics shown in FIG. 5 may be executed in any sequence or concurrently. Additionally or alternatively, some steps may be omitted, several steps may be combined into one step, and/or one step may be divided into several steps.

Figure 6:
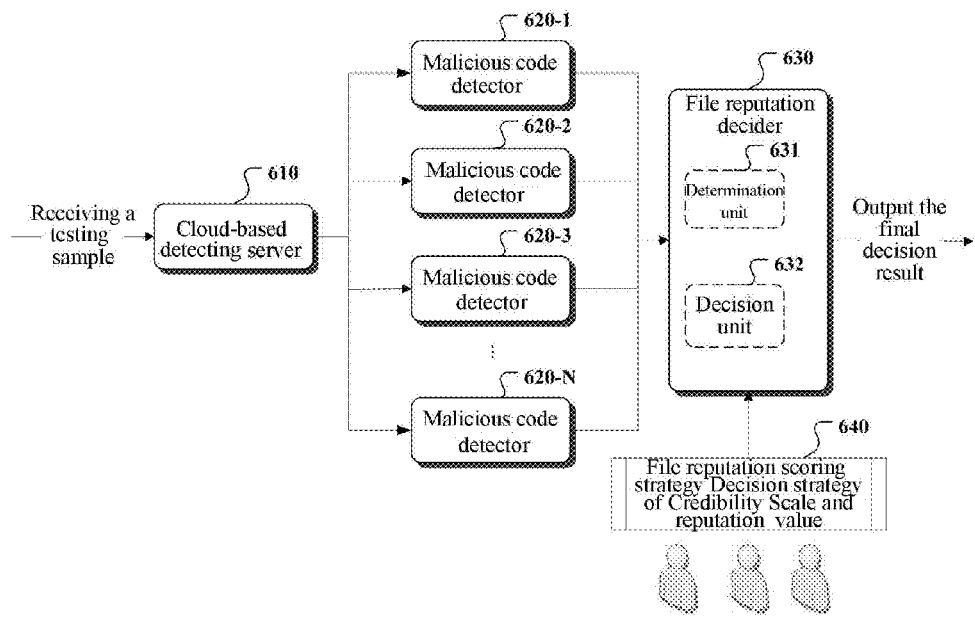
FIG. 6 illustrates an exemplary structural diagram of a system for detecting malicious code according to an embodiment of the present application.

Referring to FIG. 6, an exemplary structural diagram of a system for detecting malicious code according to an embodiment of the present application is provided. The system shown in FIG. 6 is located on the server side, particularly in one embodiment, in the cloud. The system refers generally to a server cluster consisting of a plurality of interconnected servers having different functions that cooperate to perform the malicious code detecting function, which are represented outward as a single entity.

As shown in FIG. 6, the system 600 for detecting malicious code may include a cloud-based detecting server 610 in the cloud, one or more different types of malicious code detectors 620-1, 620-2, . . . , 620-N, and a file reputation decider 630.

The cloud-based detecting server 610 in the cloud is adapted to receive a testing sample uploaded from a client and sending the sample to each of the malicious code detectors 620-1, 620-2, . . . , 620-N.

Each of the malicious code detectors 620-1, 620-2, . . . , 620-N detects the testing sample sent by the cloud-based detecting server 610 based on its own detection method. The malicious code detectors may be located on the same cloud-based detecting server or on different cloud-based servers.

The file reputation decider 630 is used for collecting the testing results from the malicious code detectors 620-1, 620-2, . . . , 620-N and analyzing the results to determine the final detection result of the sample. In some embodiments, the analysis on the testing result may include: determining the credibility scale and the reputation value of the testing results and determining the final detection result of the testing sample based on the credibility scale and the reputation value of the testing result.

In order to perform the aforementioned analyzing process, the file reputation decider 630 may include a determination unit 631 and a decision unit 632. The determination unit 631 is used for determining the credibility scale and the reputation value of the testing result based on the file reputation scoring policy from block 640. The decision unit 632 is used for processing the credibility scale and the reputation value based on the decision policy for the credibility scale and the reputation value from block 640 to obtain the final decision result for the testing samples.

When determining the credibility scale and the reputation value of the testing result, the determination unit 631 may first search for the malicious code testing result that is matched with the testing result, and then assign the credibility scale and the reputation value of the matched malicious code testing result to the testing result.

In some embodiments, the decision policy for the credibility scale and the reputation value also takes the collision priority of the testing result into consideration. In these embodiments, the determination unit 631 is further configured to assign a collision priority to the testing result. In particular, the collision priority of the testing result is determined based on the file reputation scoring policy. The determination unit 631 is further configured to determine the final detection result based on the collision priority and/or the reputation value of the testing result if a conflict exists between the credibility scales of the testing results.

In some embodiments, the exemplary decision logic of the decision policy for the credibility scale and the reputation value may, for example, include at least one of:
  if the plurality of testing results are gray, the final detection result of the testing file is determined to be gray;
  if the plurality of testing results are black, the final detection result of the testing file is determined to be black;
  if the plurality of testing results are white, the final detection result of the testing file is determined to be white;
  if a conflict exists between the plurality of testing results, the conflict being that some of the testing results are black while the rest are white, and the collision priorities are not identical, the final detection result of the testing sample is determined to be identical to the testing result with the highest priority;
  if a conflict exists between the plurality of testing results, the conflict being that some of the testing results are black while the rest are white, and the collision priorities are identical, the final detection result of the testing file is determined to be gray;
  if a conflict exists between the plurality of testing results, the conflict being that some of the testing results are black while the rest are suspected white, the final detection result of the testing file is determined to be black;

if a conflict exists between the plurality of testing results, the conflict being that some of the testing results are white while the rest are suspected black, the final detection result of the testing file is determined to be white;

if the plurality of testing results are suspected black, the final detection result of the testing file is determined to be black when the accumulated reputation value is above the first preset threshold, otherwise the final detection result of the testing file is determined to be gray;

if the plurality of testing results are suspected white, the final detection result of the testing file is determined to be white when the accumulated reputation value is above the second preset threshold, otherwise the final detection result of the testing file is determined to be gray; and if a conflict exists between the plurality of testing results, the conflict being that some of the testing results are suspected black while the rest are suspected white, the final detection result of the testing file is determined to be identical to the testing result with higher reputation value when the difference between the reputation value of the testing result of suspected black and that of the testing result of suspected white is above the third preset threshold, otherwise the final detection result of the testing file is determined to be gray.

It should be appreciated that the various sub-systems or units described in the system 600 correspond to the various steps in the method depicted with reference to FIGS. 2, and 4-5. Therefore, the operations and features described above for the method are also applicable to the system 600 and the units within the system 600, which will not be repeated herein.

Figure 7:
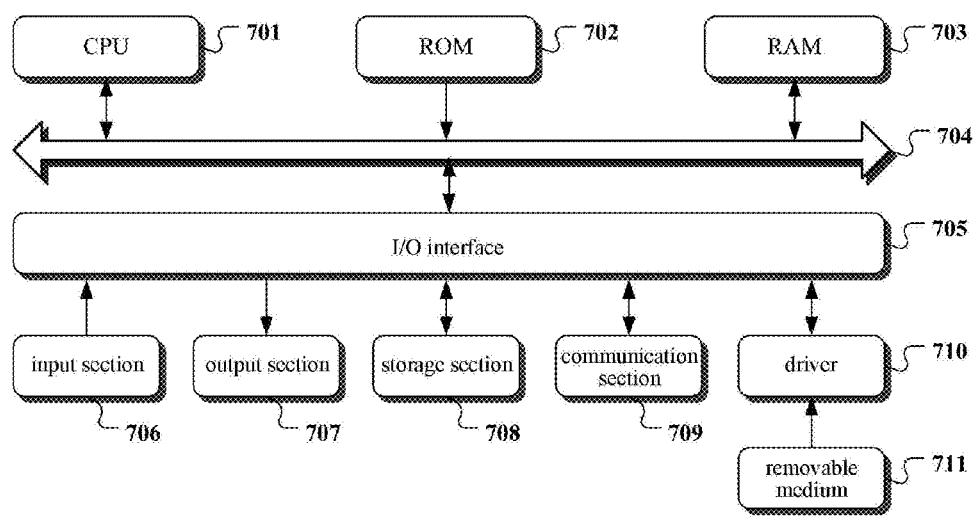
FIG. 7 illustrates a structural diagram of a computer system of a server adapted to implement an embodiment of the present application.

Now referring to FIG. 7, a structural schematic diagram of a computer system 700 of a server adapted to implement an embodiment of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage section 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input section 706 comprising at least one of a keyboard, a mouse, etc.; an output section 707 comprising at least one of a cathode ray tube (CRT), a liquid crystal display device (LCD) and a speaker etc.; a storage section 708 comprising at least one of a hard disk, etc.; and a communication section 709 comprising a network interface card, such as a LAN card and/or a modem. The communication section 709 performs communication processes via a network, such as the Internet. A driver 510 may also be connected to the I/O interface 705 as required. A removable medium 711, such as a magnetic disk, an optical disk, a magneto-optical disk, and/or a semiconductor memory, may be installed on the driver 710, to facilitate the retrieval of a computer program from the removable medium 711, and the installation into the storage section 708 as needed.

In particular, according to an embodiment of the present disclosure, the process described above with reference to FIGS. 2, and 4-5 may be implemented as a computer software program. For example, an embodiment of the present disclosure comprises a computer program product, which comprises a computer program that is tangibly embodied in a machine-readable medium. The computer program comprises program codes for executing the method of FIGS. 2, and 4-5. In such an embodiment, the computer program may be downloaded and installed from a network via the communication section 709, and/or may be installed from the removable media 711.

The flow charts and block diagrams in the figures illustrate architectures, functions and operations that may be implemented according to the system, the method and the computer program product of the various embodiments of the present invention. In this regard, each of the blocks in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a different sequence from that the sequence as shown in the figures. For example, in practice, two blocks in succession may be executed substantially in parallel, or in a reverse order, depending on the functionalities involved. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor. The names of these units or modules are not considered as a limitation to the units or modules.

In another aspect, the present application also provides a computer readable storage medium. The computer readable storage medium may be the computer readable storage medium included in the apparatus in the above embodiments, and it may also be a separate computer readable storage medium which has not been assembled into the apparatus. The computer readable storage medium stores one or more programs, which are used by one or more processors to execute the blocking method described in the present application.

The forgoing is only a description of the preferred embodiments of the present application and the applied technical principles. It should be understood by those skilled in the art that the invention scope of the present application is not limited to technical solutions formed by the particular combinations of the above technical features. It should also cover other technical solutions formed by any combinations of the above technical features or equivalent features thereof without departing from the concept of the invention. For example, a technical solution formed by replacing the features disclosed above by technical features with similar functions is also within the scope of the present invention.

The invention claimed is:

1. A method for detecting malicious code by a server storing a file reputation scoring policy and a plurality of malicious code detectors having different types of malicious code detection, the method comprising:

receiving, by the server, a testing sample sent by a client computer from a network, wherein the file reputation scoring policy associates each of the plurality of malicious code detectors with at least one type of malicious code each corresponding to a credibility scale and a reputation value, the file reputation scoring policy recording each type of the plurality of malicious code detectors, at least one type of malicious code detected by each type of the plurality of malicious code detectors, and the credibility scale and the reputation value of the at least one type of malicious code detected by each type of the plurality of malicious code detectors;

testing, by the server, the testing sample with the plurality of malicious code detectors to acquire a plurality of testing results;

comparing, by the server, the plurality of testing results with the type of malicious code recorded in the file reputation scoring policy;

dismissing, by the server, testing results which do not match the type of malicious code recorded in the file reputation scoring policy;

determining, by the server, the credibility scale and the reputation value for each of the testing results matching the type of malicious code recorded in the file reputation scoring policy based on the file reputation scoring policy, the credibility scale indicating whether the testing result is malicious, and the reputation value indicating a quantified trust level corresponding to the credibility scale; and determining, by the server, a final detection result of the testing sample based on the respective determined credibility scales and the reputation values of the testing results matching the type of malicious code recorded in the file reputation scoring policy, wherein the determining the final detection result of the testing sample based on the credibility scales and the reputation values of the testing results matching the type of malicious code recorded in the file reputation scoring policy comprises:

processing the credibility scales and the reputation values of the testing results matching the type of malicious code recorded in the file reputation scoring policy based on a decision policy for the credibility scale and the reputation value to obtain the final detection result of the testing sample, wherein the credibility scale comprises any one of: black, white, gray, suspected black and suspected white, wherein black represents the testing sample being malicious, white represents the testing sample being safe, gray represents being uncertain, suspected black represents the sample being potentially malicious, and suspected white represents the testing sample being potentially safe, wherein the decision policy comprises:

in response to the determination that the testing results are suspected black, the final detection result of the testing sample is determined to be black when a sum of the reputation values of the testing results is above a first preset threshold, otherwise the final detection result of the testing sample is determined to be gray;

in response to the determination that the testing results are suspected white, the final detection result of the testing sample is determined to be white when a sum of the reputation values of the testing results is above a second preset threshold, otherwise the final detection result of the testing sample is determined to be gray, and in response to the determination that a conflict exists between the testing results, between two or more of the plurality of malicious code detectors, the conflict being that some of the testing results are suspected black while the rest are suspected white, the test result with higher reputation between the testing result of suspected black and the testing result of suspected white is determined as the final detection result of the testing sample, a difference between the reputation value of the testing result of suspected black and the reputation value of the testing result of suspected white being above a third preset threshold, otherwise the final detection result of the testing sample is determined to be gray; providing, by the server, the final detection result of the testing sample to the client computer;

obtaining, by the server, false positive rates of respective types of the malicious code detectors according to the final detection result, different types of the malicious code detectors having different testing approaches; and setting, by the server, the reputation values of respective types of the malicious code detectors in the file reputation scoring policy based on the false positive rates of respective types of the malicious code detectors.

2. The method of claim 1, further comprising: assigning the credibility scale and the reputation value to the testing result matching the type of malicious code recorded in the file reputation scoring policy.

3. The method of claim 1, wherein the decision policy for the credibility scale and the reputation value further comprises at least one of:

if the plurality of testing results are gray, the final detection result of the testing sample is determined to be gray;

if the plurality of testing results are black, the final detection result of the testing sample is determined to be black;

if the plurality of testing results are white, the final detection result of the testing sample is determined to be white;

if a conflict exists between the testing results, between two or more of the plurality of malicious code detectors, the conflict being that some of the testing results are black while the rest are white, and collision priorities of the testing results are not identical, the final detection result of the testing sample is determined to be identical to the testing result with the highest priority;

if a conflict exists between the testing results, between two or more of the plurality of malicious code detectors, the conflict being that some of the testing results are black while the rest are white, and the collision priorities of the testing results are identical, the final detection result of the testing sample is determined to be gray;

if a conflict exists between the testing results, between two or more of the plurality of malicious code detectors, the conflict being that some of the testing results are black while the rest are suspected white, the final detection result of the testing sample is determined to be black; and if a conflict exists between the testing results, between two or more of the plurality of malicious code detectors, the conflict being that some of the testing results are white while the rest are suspected black, the final detection result of the testing sample is determined to be white.

4. A system for detecting malicious code, the system comprising:

a cloud-based detecting server for receiving a testing sample sent by a client computer from a network, the cloud-based detecting server being coupled to the client computer and the network, providing a final detection result of the testing sample to the client computer, obtaining false positive rates of respective types of the malicious code detectors according to the final detection result, setting the reputation values of respective types of the malicious code detectors in the file reputation scoring policy based on the false positive rates of respective types of the malicious code detectors, wherein the server stores the malicious code detectors having different types of malicious code detection and the file reputation scoring policy associating each of a plurality of malicious code detectors with at least one type of malicious code each corresponding to the credibility scale and a reputation value, the file reputation scoring policy recording each type of the malicious code detectors, at least one type of malicious code detected by each type of the plurality of malicious code detectors, and the credibility scale and the reputation value of the at least one type of malicious code detected by each type of the plurality of malicious code detectors;

the client computer;

the plurality of malicious code detectors, including computer readable instructions for receiving the testing sample from the cloud-based detecting server and testing the testing sample to acquire a plurality of testing results;

a file reputation decider for comparing the plurality of testing results with the type of malicious code recorded in the file reputation scoring policy, dismissing testing results which do not match the type of malicious code recorded in the file reputation scoring policy, determining a credibility scale and the reputation value for each of the testing results matching the type of malicious code recorded in the file reputation scoring policy and determining a final detection result of the testing sample for each of the testing results matching the type of malicious code recorded in the file reputation scoring policy based on the credibility scales and the reputation values of the testing results, wherein the credibility scale indicates whether the testing result is malicious, and the reputation value indicates a quantified trust level corresponding to the credibility scale, wherein the file reputation decider comprises a decision unit for processing the respective credibility scales and the respective reputation values of the testing results matching the type of malicious code recorded in the file reputation scoring policy based on a decision policy for the credibility scale and the reputation value to obtain the final detection result of the testing sample, wherein the credibility scale comprises any one of: black, white, gray, suspected black and suspected white, wherein black represents the testing sample being malicious, white represents the testing sample being safe, gray represents being uncertain, suspected black represents the sample being potentially malicious, and suspected white represents the testing sample being potentially safe;

wherein the decision policy comprises:

in response to the determination that the testing results are suspected black, the final detection result of the testing sample is determined to be black when a sum of the reputation values of the testing results is above a first preset threshold, otherwise the final detection result of the testing sample is determined to be gray, in response to the determination that the testing results are suspected white, the final detection result of the testing sample is determined to be white when a sum of the reputation values of the testing results is above a second preset threshold, otherwise the final detection result of the testing sample is determined to be gray, and in response to the determination that a conflict exists between the testing results, between two or more of the plurality of malicious code detectors, the conflict being that some of the testing results are suspected black while the rest are suspected white, the test result with higher reputation between the testing result of suspected black and the testing result of suspected white is determined as the final detection result of the testing sample, a difference between the reputation value of the testing result of suspected black and the reputation value of the testing result of suspected white being above a third preset threshold, otherwise the final detection result of the testing sample is determined to be gray; and, a determination unit for determining the credibility scale and the reputation value of the testing result for each of the testing results matching the type of malicious code recorded in the file reputation scoring policy based on the file reputation scoring policy.

5. The system of claim 4, wherein the determination unit is further configured to:

assign the credibility scale and the reputation value to the testing result matching the type of malicious code recorded in the file reputation scoring policy.

6. The system of claim 4, wherein the decision policy of the credibility scale and the reputation value further comprises at least one of:

if the plurality of testing results are gray, the final detection result of the testing sample is determined to be gray;

if the plurality of testing results are black, the final detection result of the testing sample is determined to be black;

if the plurality of testing results are white, the final detection result of the testing sample is determined to be white;

if a conflict exists between the testing results, between two or more of the plurality of malicious code detectors, the conflict being that some of the testing results are black while the rest are white, and collision priorities of the testing results are not identical, the final detection result of the testing sample is determined to be identical to the testing result with the highest priority;

if a conflict exists between the testing results, between two or more of the plurality of malicious code detectors, the conflict being that some of the testing results are black while the rest are white, and the collision priorities of the testing results are identical, the final detection result of the testing sample is determined to be gray;

if a conflict exists between the testing results, between two or more of the plurality of malicious code detectors, the conflict being that some of the testing results are black while the rest are suspected white, the final detection result of the testing sample is determined to be black; and if a conflict exists between the testing results, between two or more of the plurality of malicious code detectors, the conflict being that some of the testing results are white while the rest are suspected black, the final detection result of the testing sample is determined to be white.

7. An apparatus comprising, a memory and a processor, the memory storing computer code, a file reputation scoring policy and a plurality of malicious code detectors having different types of malicious code detection and the processor being configured to execute the computer code to implement a method comprising:

receiving a testing sample sent by a client computer from a network, the apparatus being coupled to the client computer and the network, wherein the file reputation scoring policy associates each of the plurality of malicious code detectors with at least one type of malicious code each corresponding to a credibility scale and a reputation value, the file reputation scoring policy recording each type of the plurality of malicious code detectors, at least one type of malicious code detected by each type of the plurality of malicious code detectors, and the credibility scale and the reputation value of the at least one type of malicious code detected by each type of the plurality of malicious code detectors;

testing the testing sample with the plurality of malicious code detectors to acquire a plurality of testing results;

comparing, by the server, the plurality of testing results with the type of malicious code recorded in the file reputation scoring policy;

dismissing, by the server, testing results which do not match the type of malicious code recorded in the file reputation scoring policy;

determining the credibility scale and the reputation value for each of the testing results matching the type of malicious code recorded in the file reputation scoring policy based on the file reputation scoring policy, the credibility scale indicating whether the testing result is malicious, and the reputation value indicating a quantified trust level corresponding to the credibility scale;

determining a final detection result of the testing sample based on the respective determined credibility scales and the reputation values of the testing results matching the type of malicious code recorded in the file reputation scoring policy, wherein the determining the final detection result of the testing sample based on the credibility scales and the reputation values of the testing results matching the type of malicious code recorded in the file reputation scoring policy comprises:

processing the credibility scales and the reputation values of the testing results matching the type of malicious code recorded in the file reputation scoring policy, based on a decision policy for the credibility scale and the reputation value to obtain the final detection result of the testing sample, wherein the credibility scale comprises any, one of: black, white, gray, suspected black and suspected white, wherein black represents the testing sample being malicious, white represents the testing sample being safe, gray represents being uncertain, suspected black represents the sample being potentially malicious, and suspected white represents the testing sample being potentially safe, wherein the decision policy comprises:

in response to the determination that the testing results are suspected black, the final detection result of the testing sample is determined to be black when a sum of the reputation values of the testing results is above a first preset threshold, otherwise the final detection result of the testing sample is determined to be gray, in response to the determination that the testing results are suspected white, the final detection result of the testing sample is determined to be white when a sum of the reputation values of the testing results is above a second preset threshold, otherwise the final detection result of the testing sample is determined to be gray, and in response to the determination that a conflict exists between the testing results, between two or more of the plurality of malicious code detectors, the conflict being that some of the testing results are suspected black while the rest are suspected white, the test result with higher reputation between the testing result of suspected black and the testing result of suspected white is determined as the final detection result of the testing sample, a difference between the reputation value of the testing result of suspected black and the reputation value of the testing result of suspected white being above a third preset threshold, otherwise the final detection result of the testing sample is determined to be gray;

providing, by the server, the final detection result of the testing sample to the client computer;

obtaining, by the server, false positive rates of respective types of the malicious code detectors according to the final detection result, different types of the malicious code detectors having different testing approaches; and setting, by the server, the reputation values of respective types of the malicious code detectors in the file reputation scoring policy based on the false positive rates of respective types of the malicious code detectors.

8. The apparatus of claim 7, wherein the determining the credibility scale and the reputation value based on the file reputation scoring policy comprises:

assigning the credibility scale and the reputation value to the testing result matching the type of malicious code recorded in the file reputation scoring policy.

9. The method of claim 1, wherein the file reputation scoring policy is a table recording each type of the plurality of malicious code detectors, the at least one type of malicious code detected by each type of the plurality of malicious code detectors, and the credibility scale and the reputation value of the at least one type of malicious code detected by each type of the plurality of malicious code detectors.

* * * * *